United States Patent [19]

Takagi et al.

[11] 4,051,739
[45] Oct. 4, 1977

[54] DRIVE CLUTCH FOR THE V-BELT TYPE AUTOMATIC TRANSMISSION

[75] Inventors: Izumi Takagi; Noboru Yanagiuchi, both of Akashi, Japan

[73] Assignee: Kawasaki Heavy Industries, Ltd., Japan

[21] Appl. No.: 648,808

[22] Filed: Jan. 13, 1976

[30] Foreign Application Priority Data

| Jan. 14, 1975 | Japan | 50-7580[U] |
| Jan. 14, 1975 | Japan | 50-7581[U] |
| Jan. 14, 1975 | Japan | 50-7584[U] |

[51] Int. Cl.² .......................................... F16H 55/52
[52] U.S. Cl. .................................. 74/230.17 E
[58] Field of Search .............. 74/230.17 E; 192/105 C

[56] References Cited
U.S. PATENT DOCUMENTS

| 2,310,081 | 2/1943 | Hill | 74/230.17 E |
| 3,017,783 | 1/1962 | Brugghen | 74/230.17 E |
| 3,401,582 | 9/1968 | Jaulmes | 74/230.17 E |
| 3,574,366 | 4/1971 | Thostenson | 74/230.17 E |
| 3,727,478 | 4/1973 | Erickson et al. | 74/230.17 E |
| 3,812,731 | 5/1974 | Sugimoto et al. | 74/230.17 E |
| 3,961,539 | 6/1976 | Tremblay et al. | 74/230.17 E |

OTHER PUBLICATIONS

"Shop Manual", Feb. 1973, revised edition, Comet Industries, Division of Hoffco, Inc., Richmond, Ind.

Primary Examiner—Samuel Scott
Assistant Examiner—Allan R. Burke
Attorney, Agent, or Firm—Wenderoth, Lind & Ponack

[57] ABSTRACT

An improved drive clutch device for a V-belt type automatic transmission having a stationary sheave fixed to a driving shaft and a movable sheave slidable along the driving shaft and opposed to said stationary sheave, in which a cam weight having a cam surface and acting as a centrifugal weight and a roller in engagement with the cam surface of said cam weight are pivotally supported on said driving shaft and on said movable sheave respectively and said movable sheave is caused to slide toward said stationary sheave by the centrifugal force caused by rotation of said cam weight to vary the pulley diameter.

4 Claims, 5 Drawing Figures

DRIVE CLUTCH FOR THE V-BELT TYPE AUTOMATIC TRANSMISSION

This invention relates to a drive clutch device connected to the driving shaft side of a V-belt type automatic transmission comprising a pair of pulley type clutch mechanisms for a v-belt, each having a stationary sheave secured to a shaft and an opposite movable sheave axially slidable along the shaft, and more particularly, to a drive clutch device which is so designed that a slidable cam weight having a cam surface for converting centrifugal force into axial thrust and a roller in engagement with said cam weight are respectively supported by the aforementioned driving shaft and by a cylindrical type movable sheave having one end open and having a cover thereon, respectively, whereby the movable sheave is urged to slide toward the stationary sheave by centrifugal force caused by the rotation of the aforementioned cam weight, through the medium of the roller, and thus the pulley diameter is varied.

The conventional drive clutch device for automatic transmission of the above-mentioned type is designed as shown by FIG. 4 but has generally the following three disadvantages.

1. In FIG. 4, a main shaft $b$ is secured to a driving shaft $a$ and a stationary sheave $c$ is fixed to said main shaft $b$. A movable sheave $d$ opposed to said stationary sheave $c$ and defining therewith a V-shaped groove is slidably mounted on the main shaft $b$. A cam weight $e$ is pivotally supported on said movable sheave $d$ and a roller $f$ is supported on the aforementioned main shaft $b$ by a bracket $g$. Said cam weight $e$ and said roller $f$ are in engagement with each other for cooperative action, namely, centrifugal force caused by the rotation of said cam weight $e$ urges the movable sheave $d$ toward the stationary sheave $c$, with the roller $f$ as a pivotal point. In this arrangement of the conventional device, however, the pivotal point $O_1$ of the cam weight $e$ is positioned radially outwardly of the pivotal point $O_2$ of the roller $f$ and is positioned in a direction opposite to the direction of the swinging of the cam weight $e$ with respect to the pivotal point $O_2$ of the roller $f$, namely, the contact between the cam weight $e$ and the roller $f$ is a convex contact over almost all the surface. Such a convex contact involves a very great contact surface pressure, which can cause damage to the cam weight $e$ or the roller $f$, with resultant breakdown of the device. It is possible to make the contact partly concave but at the point of transition between the concave contact portion and the convex contact portion, the relative radius of curvature of the cam surface of the cam weight $e$ becomes extremely small and the surface pressure at the transition point becomes extremely large, with the result that the cam weight $e$ is more likely to be damaged. Also, as the axial distance between the center of gravity $O_3$ and the pivotal point $O_1$ of the cam weight $e$ becomes smaller, a higher degree of precision in manufacture or adjustment of the parts is required.

2. In the conventional drive clutch device, the torque of the driving shaft $a$ rotates the movable sheave $d$ in synchronism with the stationary sheave $c$ through the main shaft $b$ and also through the medium of a bracket $g$ pivotally supporting the roller $f$ and secured to said main shaft $b$ and a post member $h$ which protrudes from the end surface of the movable sheave $d$. As this post member $h$ is cantilevered from the end surface of the movable sheave $d$, it is relatively weak. In order to reinforce the post member $h$, a reinforcing rib $i$ connecting said post member $h$ and the cylinder is provided, but satisfactory reinforcing is impossible because of the space available within the movable sheave $d$ and from the manufacturing aspect. It has often occurred in conventional clutch devices that the post member $h$ is damaged, with resultant breakdown of the device.

3. Furthermore, in the conventional drive clutch device when the pulley diameter reaches its maximum or when the movable sheave $d$ slides toward the stationary sheave $e$ to the full extent as shown in FIG. 5, a cover $k$ fixed integrally to the movable sheave $d$ and the bracket $g$ come into direct contact with each other, the cover K acting as a stop. Accordingly, fretting wear is caused on both contacting elements which makes it impossible to maintain a proper stop position over a long period of time. Also, to allow for the possibility of direct collision between the cover $k$ and the bracket $g$ when the V-belt happens to snap during running, the bracket $g$ and the cover $k$ are given considerable rigidity and therefore they are heavier in weight than would otherwise be necessary, which is detrimental to the smooth operation.

The present invention has been made to overcome the above-described disadvantages. In the present invention, the pivotal point of the cam weight which performs the action of adjusting the axial thrust of the belt pulley and also acts as a centrifugal weight, is positioned radially inwardly of the pivotal point of the roller and in the same direction from the center of the roller as the direction in which the cam weight swings, whereby there is produced concave contact between the cam surface of the cam weight and the roller along all the working surface, and also the drive clutch device for the V-belt type automatic transmission has the axial distance between the center of gravity and the fulcrum of the cam weight larger than heretofore to eliminate the first disadvantage of the conventional device described above.

Also, the present invention has a construction such that the rib provided in the cylindrical part of the enclosed type movable sheave and the spider part of the bracket secured to the driving shaft through the main shaft, are connected with each other so as to transmit the torque of the bracket to the movable sheave. the aforementioned rib is secured, by means of a bolt, to the cover for enclosing the end of the cylindrical part of the movable sheave, thereby improving the transmission of torque for the driving shaft to the movable sheave, as well as the strength of the rib itself, and thus eliminating the second disadvantage of the conventional device described above.

Furthermore, the present invention has a construction such that when the movable sheave is caused to slide toward the stationary sheave to the full extent, namely, when the pulley diameter reaches its maximum, the bracket and the cover for the movable sheave are in contact, through the medium of an elastic bushing, which acts as a stop, thereby preventing fretting wear caused by direct contact between the bracket and the cover and also preventing damage due to collision between the two. Thus, the present invention eliminates the third disadvantage of the conventional device described above.

The nature and advantages of the present invention will be understood more clearly from the following description made with reference to the accompanying drawings, in which.

Figure 1:
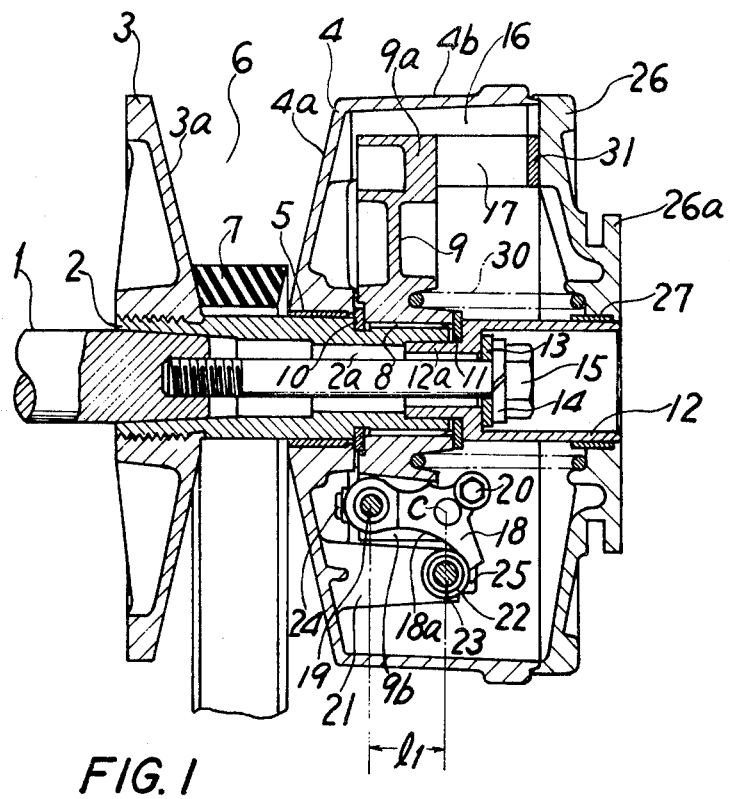
FIG. 1 is a longitudinal sectional elevation of the central part of an embodiment of the present invention, in its real state.
Figure 2:
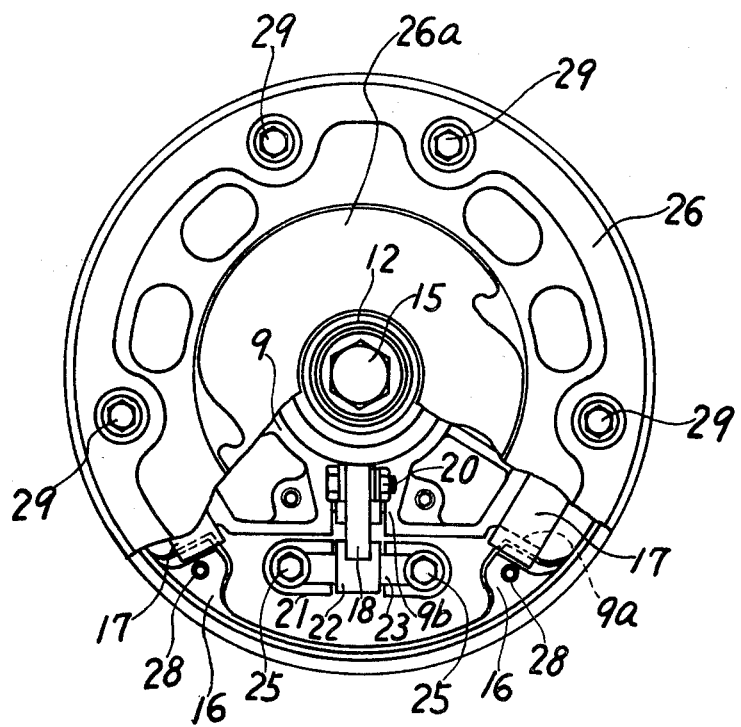
FIG. 2 is a front view of the central part of the embodiment, partly broken away, shown in FIG. 1.

In FIG. 1 and FIG. 2, numeral 1 denotes a driving shaft on the engine output side. A main shaft 2 is connected integrally with said driving shaft 1 by means of a taper engagement. Secured to said main shaft 2 is a stationary sheave 3 having a conical surface 3a on one side. A movable sheave 4 of cylindrical shape having one one side a conical surface 4a opposed to aforementioned surface 3a and on the other side an opening, is mounted slidably on said driving shaft 2, through the medium of a bushing 5. The conical surfaces 3a and 4a of the stationary sheave 3 and the movable sheave 4 respectively, define therebetween a V-shaped groove 6, in which a V-belt 7 is put. A spline 8 is formed on the outer periphery of the axial end portion of the aforementioned main shaft 2. A bracket 9 is engaged with said spline 8 by means of key lock and is fixed to the main shaft 2 by means of a split washer 10 and a flat washer 11. Fixed axially to the axial end surface of the aforementioned main shaft 2 is a retainer 12 having a diameter larger than the outside diameter of the above-mentioned spline 8. This retainer 12 has at its one end portion a shoulder part of a smaller diameter 12a which is inserted into a central hole 2a in the main shaft 2 and is fixed axially to the driving shaft 1 by fastening a bolt 15 into the driving shaft 1 at the end surface of the shoulder part 12a (within the retainer 12), through the medium of a flat washer 13 and a spring washer 14. The aforementioned bracket 9 has several spider parts 9a at its periphery. On the inner periphery of the cylindrical part 4b of the movable sheave 4, a number of ribs 16 equal to the number of spider parts 9a project in the radially inward direction so that each spider part 9a engages with the corresponding rib 16 through the medium of a bushing 17 to transmit torque from the main shaft 2 to the movable sheave 4. Also, each rib 16 is slidable with respect to the corresponding spider part 9a through the bushing 17 when the movable sheave 4 slides. The aforementioned bracket 9 has a pair of supports 9b spaced circumferentially therearound on which a cam weight 18 which converts centrifugal force into axial thrust is pivotally and swingably supported through a pin 19. This cam weight 18 has a concave cam surface 18a and has thereon an additional weight 20 at the free end thereof. On the other hand, the movable sheave 4 is provided with a roller support 21, at the end of which a roller 22 is rotatably mounted on a pin 23, in engagement with the cam surface 18a of the cam weight 18. The pivotal point (pin 19) of the cam weight 18 is positioned radially inwardly of the axis of rotation (pin 23) of the roller 22 and also is in the same direction from the center of the roller as the direction in which the cam weight 18 swings. Numerals 24 and 25 designate bolts to fix the pin 19 and the pin 23 respectively.

Over the opening of the aforementioned movable sheave 4, a cover 26 to cover said opening is slidably engaged with the retainer 12 through the medium of a bushing and is fixed to the rib 16 of the movable sheave 4 by bolts 29 threaded into threaded holes 28 at the end surface of the ribs 16. A starter pulley 26a is formed integrally with this cover 26. Inserted between the cover 26 and the bracket 9 is a coil spring 30 which biases the movable sheave 4 in the direction away from the stationary sheave 4, namely, in the direction to cause the V-shaped groove to widen, in the rest state of the device. Fixed to the inner wall surface of the cover 26 and opposite to each spider part 9a of the bracket 9 is a bushing 31 made of resin or other elastic material which acts as a stop when the movable sheave 4 slides toward the stationary sheave 3 to the full extent (namely, when the pulley diameter is at its maximum). In this embodiment, the elastic bushing 31 and the aforementioned bushing 17 are formed integrally with each other. Other embodiments of the retainer 12 may be used, for example, a retainer of cylindrical shape having a diameter larger than the outside diameter at the end portion of the main shaft 2 and having on the inner peripheral surface of its intermediate part an annular protrusion projecting in the radially inward direction, can be engaged with the axial end portion of the main shaft 2 and can be fixed by means of a bolt to the annular protrusion. The retainer 12 may be formed integrally with the flast washer 11.

Figure 3:
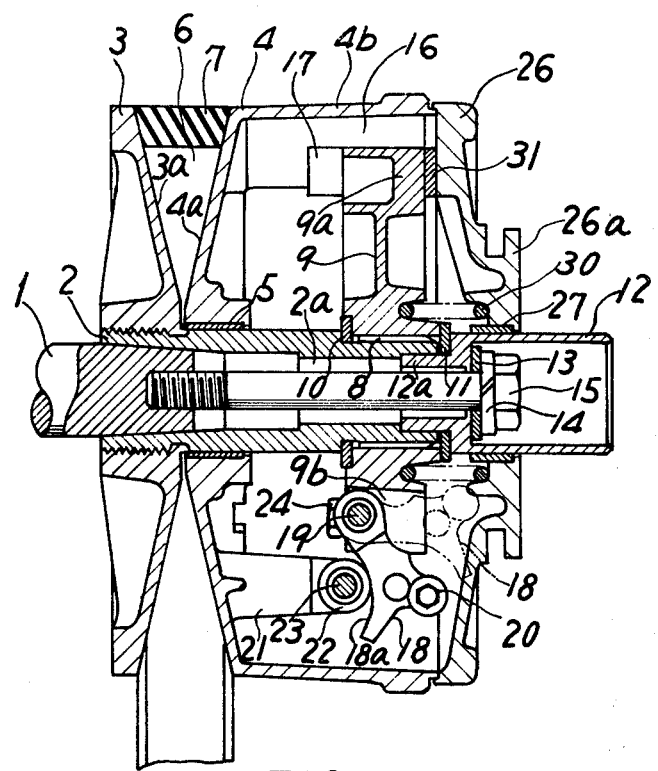
FIG. 3 is a longitudinal sectional elevation of the central part of the embodiment of the present invention shown in FIG. 1, with the pulley diameter at its maximum.
Figure 4:
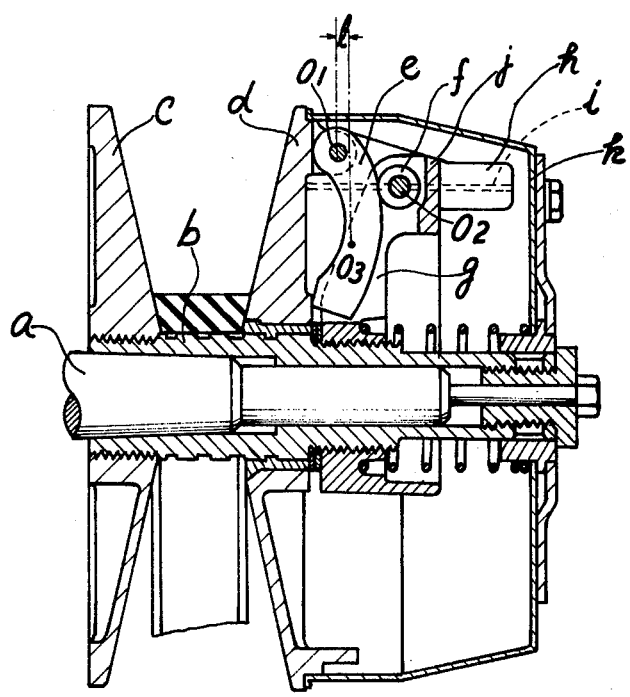
FIG. 4 is a longitudinal sectional elevation of the central part of a conventional device, in its rest state.
Figure 5:
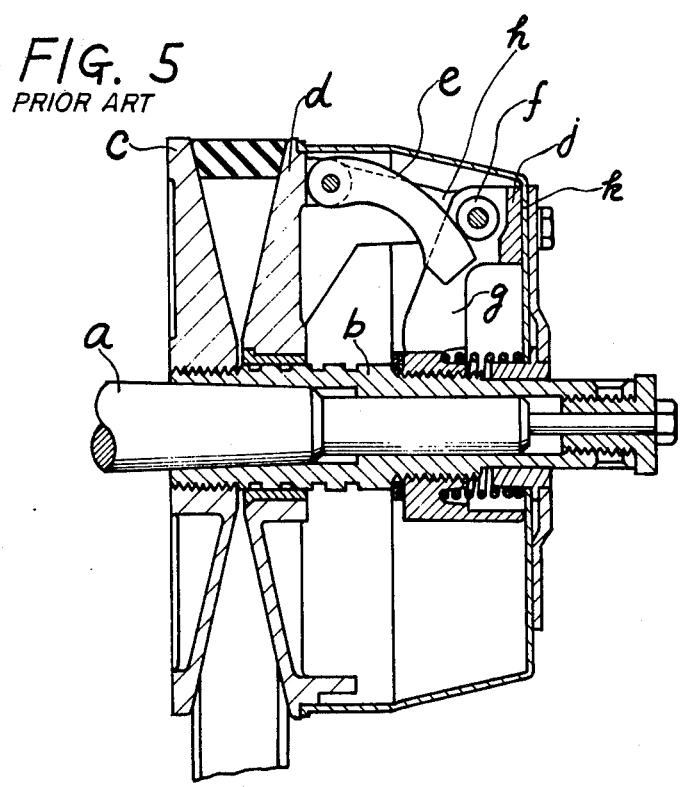
FIG. 5 is a longitudinal sectional elevation of the central part of the conventional device, with the pulley diameter at its maximum.

Referring now to the operation of the above-described embodiment, as seen in FIG. 1 and FIG. 3, when the driving shaft 1 begins to rotate at the starting of the engine, the movable sheave 3 and the bracket 9 are rotated through the medium of the main shaft 2. With the rotation of said bracket 9, the spider parts 9a engage the ribs 16 through the medium of the bushings 17, whereby the movable sheave 4 and the cover 26 (including the starter pulley 26a) integral with said movable sheave 4, are rotated. At this time, the ribs 16 are subjected to very great impact and pressure. However, the ribs 16 are rigid enough to withstand such external forces because they are integral with the inside of the movable sheave 4 and the cylindrical part 4b, and the ends are supported by the cover 26 through the medium of the bolts 29.

When all the rotary members (stationary sheave 3, movable sheave 4, bracket 9, cover 26, etc.) run at a high speed, the cam weight 18 is urged to swing around the pin 19 as a pivotal point by centrifugal force caused by high speed rotation of the bracket 9 and presses the roller 22 which is in contact with the concave cam surface 18a of said cam weight 18. This pressure is converted into axial thrust, which slides the movable sheave 4 toward the stationary sheave 3 against the spring force of the coil spring 30. According to this sliding of the movable sheave 4, the width of the V-shaped groove (pulley diameter) is varied and thus the rotation ratio is changed infinitely. At this time, the above-mentioned pressure (axial thrust) is a very great force, but since the pivotal point (pin 19) of the cam weight 18 which acts as a belt pulley axial thrust adjuster and as a centrifugal weight is positioned radially inwardly of the axis of rotation (pin 23) of the roller 22 and in the same direction from the center of the roller as the direction in which the cam weight 18 swings and also the cam surface 18a of the cam weight 18 is concave, the contact between the cam surface 18a of the cam weight 18 and the roller 22 is a concave contact along all the operating surface, and accordingly contact surface pressure is reduced to a great degree. Moreover, since the axial distance $l_1$ between the center of gravity $c$ and the pivotal point (pin 19) of the cam weight 18 is large, any error due to irregularity of manufacture will have very little influence on the above-mentioned axial thrust.

If the speed at which the driving shaft 1 is running is increased further, the movable sheave 4 slides nearer to the stationary sheave 3, and the pulley diameter reaches its maximum, when the sliding of the movable sheave 4 is checked by the resin bushing 31 provided on the inner wall surface of the cover 26. Since these resin bushing 31 act as a stop, they mitigate the collision between the spider part 9a of the bracket 9 and the cover 26 and thus prevent wear thereof.

The movable sheave 4 slides with the main shaft 2 and the retainer 12 as guides. Since the retainer 12 is separated from the main shaft 2 and has a diameter larger than the outside diameter of the spline 8 at the axial end portion of main shaft 2, it is easy to assemble the movable sheave 4 and the bracket 9. Moreover, by making the minimum pulley diameter smaller, the range of varible speeds can be increased and it is possible to increase the strength of the retainer itself and the bearing area of the bushing 27 for covering the retainer.

In the drive clutch device for the V-belt type automatic transmission according to the present invention, since the pivotal point of the cam weight acting as the belt pulley axial thrust adjuster and as a centrifugal weight is positioned radially inwardly of the pivotal point of the roller and in the same direction from the center of the roller as the direction in which the cam weight swings, the contact between the cam surface of the cam weight and the roller is a concave contact along the entire operating surface, and accordingly the contact surface pressure can be reduced to a large extent, with a resultant increase in wear-resistance and usable life of the cam weight. In addition, because the distance between the center of gravity of the cam weight and the pivotal point of the cam weight is relatively large, a high manufacturing precision is not required and even if the precision of the distance between the pivotal point of the cam weight and that of the roller is not satisfactory, it has very little influence upon the belt pulley thrust. In other words, the present invention insures stable rotation speed.

According to the present invention, several spider parts are provided on the outer periphery of the bracket which is secured to the driving shaft and which supports the cam weight or the roller; ribs are provided on the inside of the cylindrical part of the cylindrical, enclosed type movable sheave and opposite to said spider parts so that ribs are engaged by the aforementioned spider parts through bushings; and the cover to cover the opening of the movable sheave is fixed to the ends of the ribs by means of bolts. With this arrangement, because the ribs are integral with the back side of the sheave and the inside of the cylindrical part of the sheave and the ends of the ribs are supported by the cover, transmission of torque from the driving shaft to the movable sheave can be improved to a large extent, with the result that such damage as has been experienced with the conventional devices can be prevented. Moreover, the torque transmitting construction is simple, with the consequent ease of manufacturing of the device.

Furthermore, according to the present invention a bushing made of resin or other elastic material is interposed between the cover secured to the opening end of the cylindrical part of the movable sheave and the bracket secured to the driving shaft. With this arrangement, since the contact between the cover and the bracket which acts as a stop at the maximum pulley diameter is effected through the medium of the bushing, even if the V-belt snaps during running and the cover collides with the bracket, the shock can be mitigated and damage due to such a shock can be prevented. Therefore, use of a heavy bracket and a heavy cover as in the case of the conventional device to provide safety and strength can be eliminated. In the case where the operation is maintained for long hours at maximum pulley diameter, fretting wear between the cover and the bracket can be prevented by the interposition of the elastic bushing and accordingly it is possible to maintain the proper stop position for a long time.

What is claimed is:

1. A drive clutch device for the V-belt type automatic transmission comprising:
   a. a driving shaft;
   b. a stationary sheave having a sheave surface and fixed to the driving shaft;
   c. a movable sheave having a sheave surface and a hollow cylindrical portion which extends in the opposite direction from the sheave surface and has the free end thereof open, said movable sheave being rotatably and axially slidably mounted on the driving shaft with the sheave surface thereof opposed the stationary sheave, said sheave surface surface of the movable sheave and said sheave surface of the stationary sheave defining therebetween a V-shaped groove in which a V-belt is positioned;
   d. a cover enclosing the open end of the cylindrical portion of the movable sheave and also being slidable along the driving shaft;
   e. a bracket fixed to said driving shaft for transmitting rotation of the driving shaft to said movable sheave;
   f. a spring interposed between said bracket and said cover in for biasing the movable sheave in a direction away from the stationary sheave;
   g. a roller rotatably mounted on said movable sheave around an axis transverse to and spaced from the axis of said driving shaft; and
   h. a cam weight acting as a centrifugal weight and pivotally supported on said bracket around an axis parallel to said roller as is for swinging movement radially outwardly of said driving shaft and having a concave cam surface in engagement with said roller for urging said movable sheave to slide along said driving shaft against the force of said spring toward said stationary sheave when centrifugal force caused by rotation of said cam weight swings said cam outwardly, thereby varying the pulley diameter, the pivotal axis of said cam weight being radially inwardly of the center of said roller with respect to said driving shaft and in the same direction from the center of the roller as the direction in which the cam weight swings so that said roller is movable along the concave surface of said cam.

2. A drive clutch device as claimed in claim 1, in which said bracket has a plurality of spider parts thereon spaced circumferentially thereof, and the inner surface of said cylindrical portion has ribs with bushings thereon projecting therefrom with the bushings slidably engaged with corresponding ribs, the ends of the ribs toward the sheave surface being integral with the sheave.

3. A drive clutch device as claimed in claim 2, in which the ends of the ribs toward the open end of the cylindrical portion each have a bolt therein connecting the ribs to said cover.

4. A drive clutch device as claimed in claim 2, further comprising:
a bushing of elastic material on the inner surface of the cover for contacting the spider part of the bracket when the movable sheave is caused to slide toward the stationary sheave.

* * * * *